United States Patent [19]
Huang et al.

[11] Patent Number: 6,135,450
[45] Date of Patent: Oct. 24, 2000

[54] WEARABLE VIBRATION DEVICE FOR VIDEO GAMES

[76] Inventors: Cheng-Pin Huang, Shi Long Keng Village, Shin-Jin Township, Shen Zhen, Taiwan; Kelly Dell Tyler, P.O. Box 841, Jamul, Calif. 91935

[21] Appl. No.: 09/020,470

[22] Filed: Feb. 9, 1998

[51] Int. Cl.[7] .................................................. A63F 9/00
[52] U.S. Cl. ........................ 273/148 B; 463/47; 463/39; 463/30
[58] Field of Search ................................... 463/7, 36, 37, 463/38, 39, 8, 30, 31, 32, 33, 34, 47; 273/148 B

[56] References Cited

U.S. PATENT DOCUMENTS

| | | | |
|---|---|---|---|
| 5,669,818 | 9/1997 | Thorner et al. | 463/30 |
| 5,857,986 | 5/1999 | Moriyasu | 601/49 |
| 5,860,861 | 1/1999 | Lipps et al. | 463/36 |
| 5,897,437 | 4/1999 | Nishiumi et al. | 463/47 |
| 6,001,014 | 12/1999 | Ogata et al. | 463/37 |

*Primary Examiner*—Jessica J. Harrison
*Assistant Examiner*—Julie Kasick
*Attorney, Agent, or Firm*—Charles C. Logan, II

[57] ABSTRACT

A wearable vibration device for video games having a video game electrical signal decoder unit. An I.C. circuit, a D.C. battery, and an electrical circuit are located in the decoder unit. The decoder unit has an electrical input terminal for connection to a video game CPU and it has an electrical output terminal for connecting a video game controller thereto. A vibration unit has means for mounting it on a person's hand. Different systems can be utilized to transmit instructions from the decoder unit to the vibration unit, the simplest structure would be electrical wires connecting the two units.

3 Claims, 3 Drawing Sheets

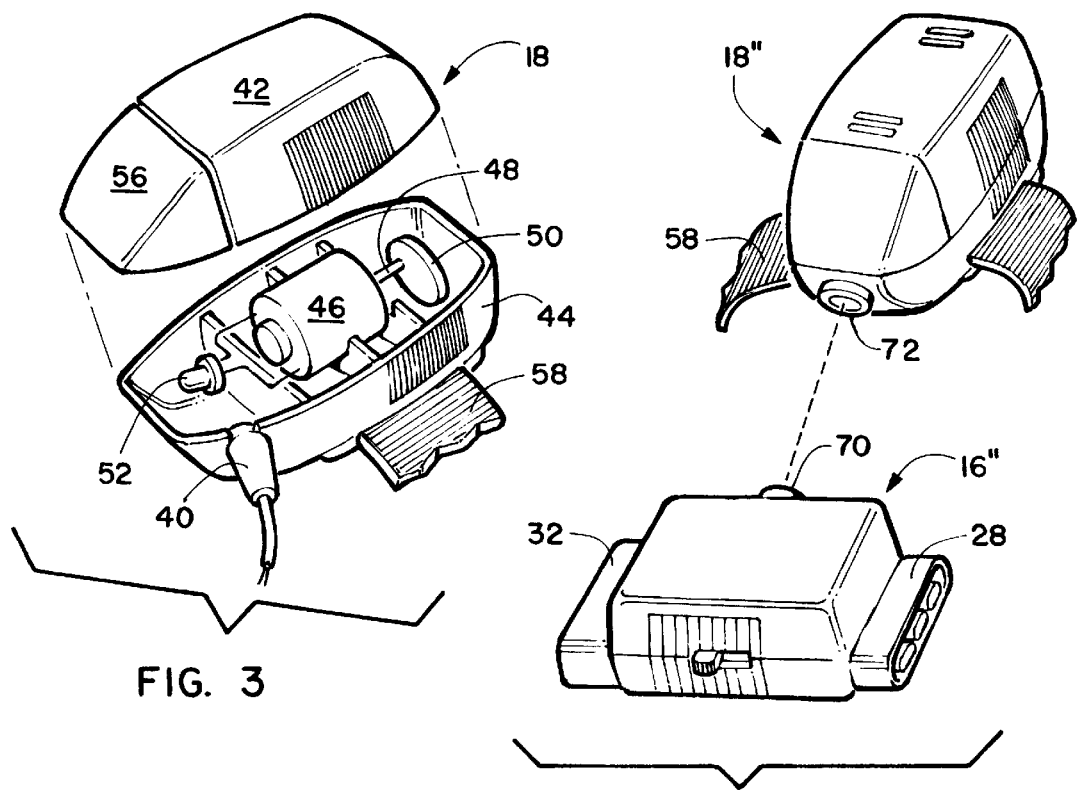
FIG. 3
FIG. 5
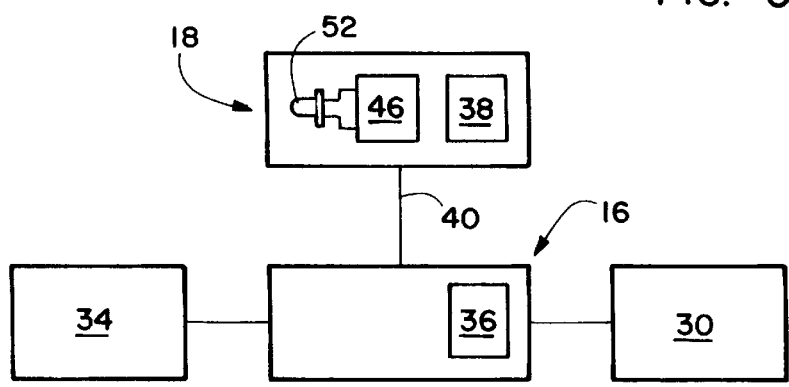
FIG. 6
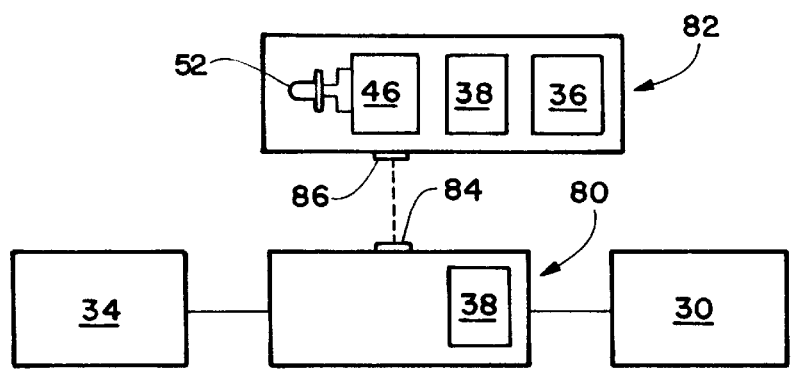
FIG. 7

WEARABLE VIBRATION DEVICE FOR VIDEO GAMES

BACKGROUND OF THE INVENTION

The invention relates to video games and more specifically a vibration device for video games that is worn by each of one or more players.

Video games for adults and children have been around for over 20 years. Improved recent video games have incorporated three dimensional view and improvements have been made to give increased reality to the players. The action heroes and vehicles in the video games now have improved sound effects and vibration effects. New video game joystick controllers incorporate structure to give the user the feel of different vibrations that the action hero or vehicle would undergo on the video screen.

The video game controllers that have been purchased throughout the past 20 years do not have structure that could be modified to receive the new vibration features that are available with todays improved video games. The present owners of what are now obsolete video game controllers have the option of purchasing a new video game controller that incorporates the new vibration features or he can continue to use his old video game controller and not be able to enjoy the full actual reality features of todays new and improved video games.

It is an object of the invention to provide a novel wearable vibration device for video games that can be used with obsolete video game controllers lacking the newer vibration effects features.

It is also an object of the invention to provide a novel wearable vibration device for video games that has a terminal that allows it to be directly plugged into a video game CPU, such as a Playstation or computer, and also having an input terminal into which are plugged video game controllers or joysticks lacking vibration effect features.

It is another object of the invention to provide a novel wearable vibration device for video games that can easily be hooked up to existing video game CPU's and obsolete video game controllers.

It is an additional object of the invention to provide a novel wearable vibration device for video games that is economical to manufacture and market.

It is a further object of the invention to provide a novel vibration device for video games that can be easily and quickly attached to a player's hand fingers, wrist, head and/or other body part.

SUMMARY OF THE INVENTION

The novel wearable vibration device for video games has as its basic components a video game electrical signal decoder unit and a vibration unit.

The decoder unit has an electrical input terminal on its front end that would be plugged into an output terminal on the rear end of a video game CPU. Electrical signals would be transmitted to the decoder unit, and more specifically its I.C. (integrated circuit) that is mounted on a circuit board. An electrical output terminal is mounted on the rear end of the decoder unit and it would receive an input terminal from a video game controller. The player using the video game controller would operate its various buttons to give animated motion to an action figure or vehicle on a video game that has been inserted into the CPU. The I.C. is powered by a pair of batteries or other power sources in or going into the decoder unit. The battery power also passes through an electrical wire to the vibration unit.

The vibration unit has a top housing and a bottom housing. A motor having a driveshaft is mounted in the bottom housing and a disk is eccentrically mounted on the driveshaft. An L.E.D. is mounted in the bottom housing beneath the lens member which allows it to shine through the lens member. The electrical motor and L.E.D. are powered by the electrical current passing through the wire that is connected to the batteries in the decoder unit. A strap is removably secured to the bottom housing of the vibration unit and it has two free ends that would overlap and be held together by hook and loop fastening material. This allows the vibration unit to be secured to a person's fingers or hand and allows for adjustment due to different sizes of various body members.

An alternative embodiment eliminates the electrical wire connecting the decoder unit to the vibration unit. The remaining components in these two embodiments are essentially the same. The new embodiment requires an infrared or a radio frequency transmitter mounted in the decoder unit and an infrared or a radio frequency receiver mounted in the vibration unit. It would also be necessary to provide a source of electrical power for the L.E.D. and motor therein.

DESCRIPTION OF THE DRAWINGS

FIG. 3 is an exploded perspective view of the vibration unit;

FIG. 5 is a second alternative embodiment of the novel wearable vibration device for video games;

FIG. 6 is a schematic illustration of a variation of the components of the embodiment seen in FIG. 2;

FIG. 7 is a schematic illustration of the components of the alternative embodiments seen in FIGS. 4 and 5;

DESCRIPTION OF THE PREFERRED EMBODIMENT

Figure 1:
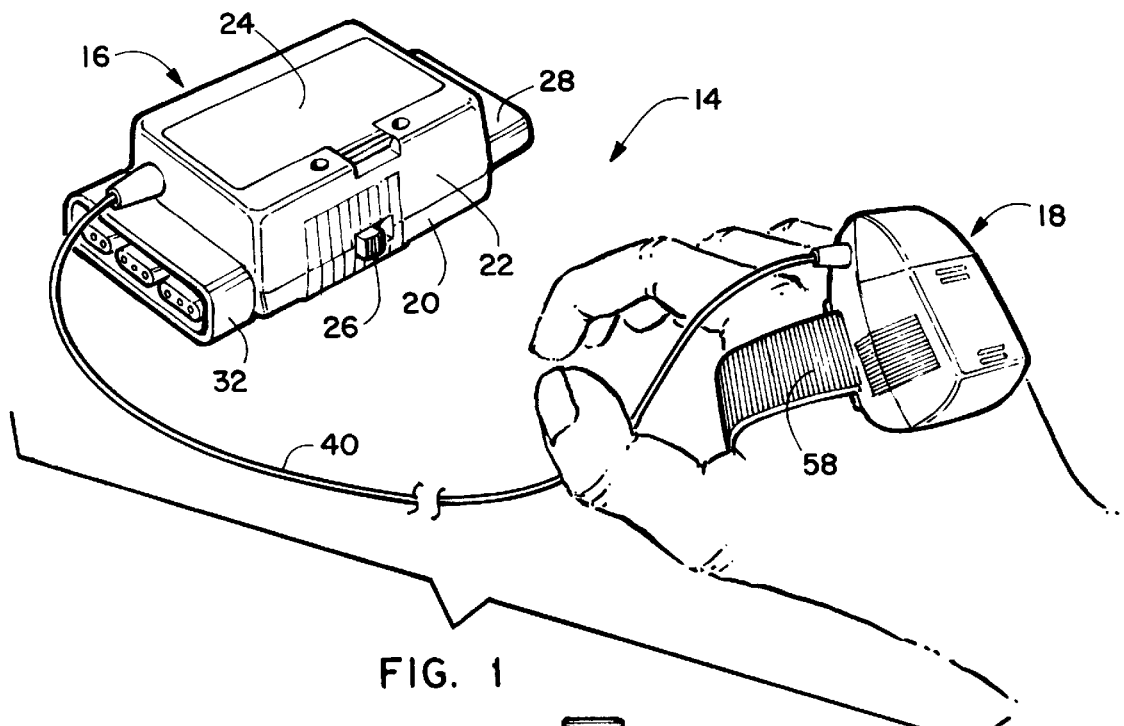
FIG. 1 is a rear perspective view of the novel wearable vibration device for video games.

The wearable vibration device for video games is generally designated numeral 14 and it will be described by referring to FIGS. 1–3 of the drawings. The major components are the decoder unit 16 and the vibration unit 18.

Decoder unit 16 is illustrated upside down and it has a top housing 20, a bottom housing 22 a removable battery compartment cover 24 and an external switch 26. An electrical input terminal 28 is formed at the front end of the decoder unit and it would be removably plugged into an input terminal on a video game CPU 30. An electrical input terminal 32 is positioned adjacent the rear end of the decoder unit 16 and it would removably receive an outlet terminal on an electrical cord connected to a video game controller 34.

Figure 2:
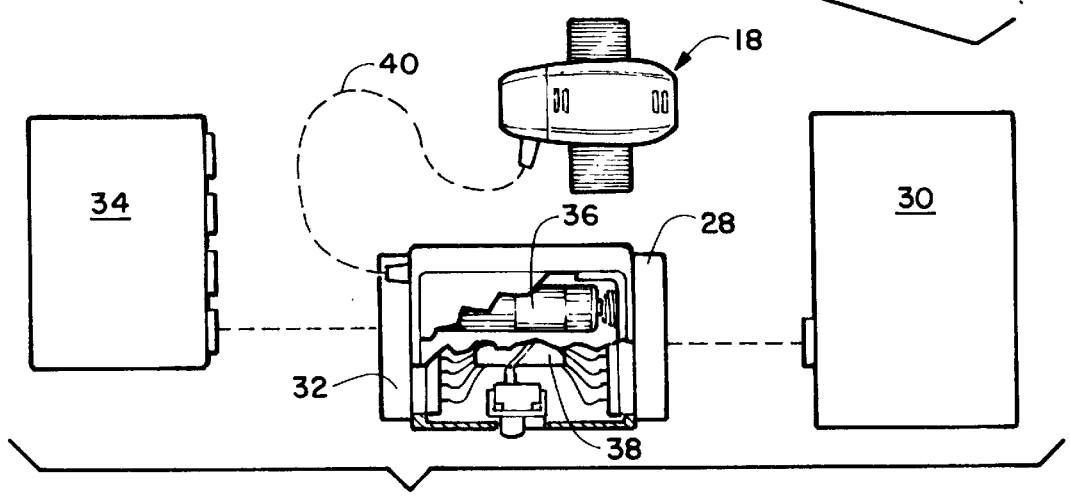
FIG. 2 is a schematic illustration of the components of the wearable vibration device.

In FIG. 2, a schematic breakaway of the decoder unit 16 shows a pair of D.C. batteries 36 and an I.C. 38 mounted on a circuit board. Also shown are electrical wires connecting electrical input terminal 28, electrical input terminal 32 and switch 26 to the I.C. An electrical wire 40 connects decoder unit 16 to the vibration unit 18.

Vibration unit 18 is best understood by referring to FIG. 3. It has a top housing 42 and a bottom housing 44. An electric motor 46 having a driveshaft 48 is mounted in bottom housing 44. A disk 50 is eccentrically mounted on shaft 48 to impart a vibration motion to the vibration unit 18. An L.E.D. 52 and motor 46 are electrically connected to electrical wire 40. A lens member 56 is positioned above L.E.D. 52 thereby allowing its light to shine through the lens member. A strap 58 is connected to the bottom housing 44 and its free ends have overlapping hook and loop fastening structure to allow it to accommodate larger or smaller sized hands or other body parts.

Figure 4:
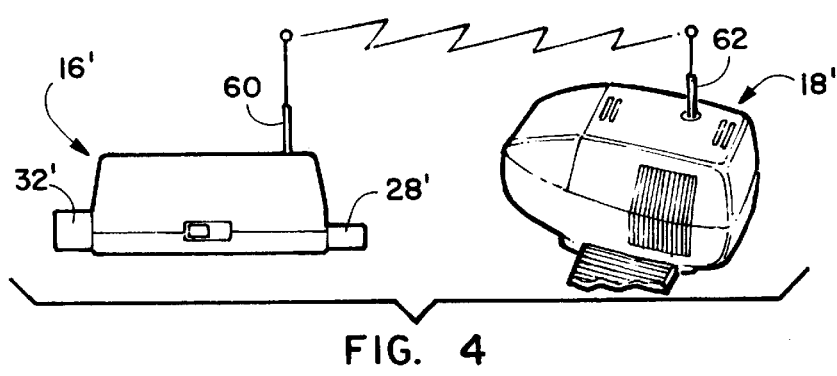
FIG. 4 is a first alternative embodiment of the novel wearable vibration device for video games.
Figure 8:
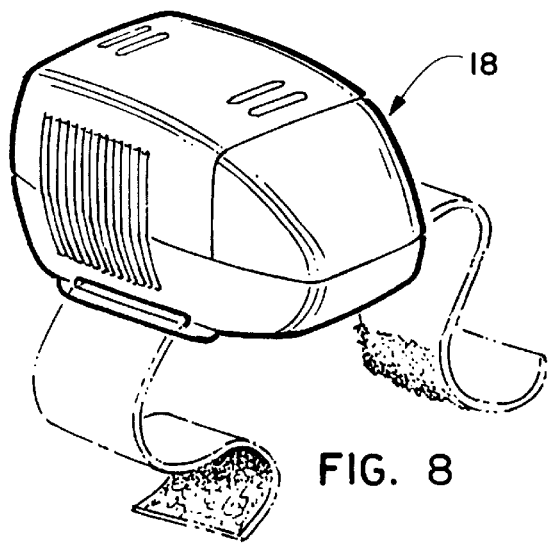
FIG. 8 is a front perspective view of the vibration unit.
Figure 9:
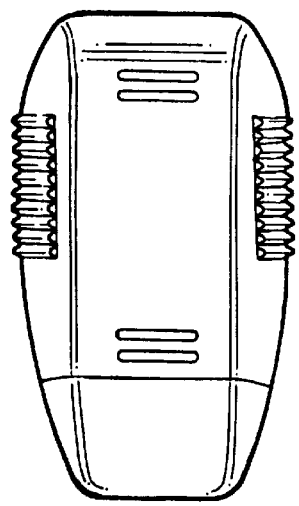
FIG. 9 is a top plan view of the vibration unit.
Figure 10:
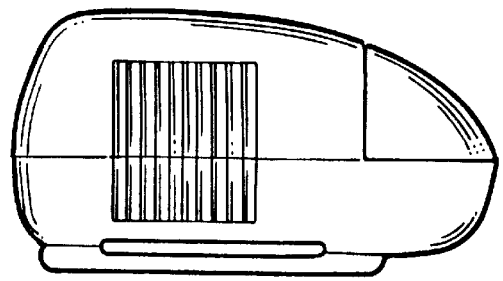
FIG. 10 is a left side elevation view of the vibration unit and the right side elevation view is the reverse image thereof.
Figure 11:
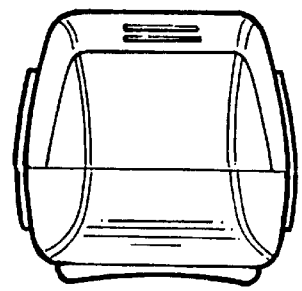
FIG. 11 is a front elevation view of the vibration unit.
Figure 12:
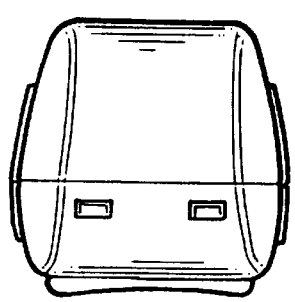
FIG. 12 is a rear elevation view of the vibration unit.
Figure 13:
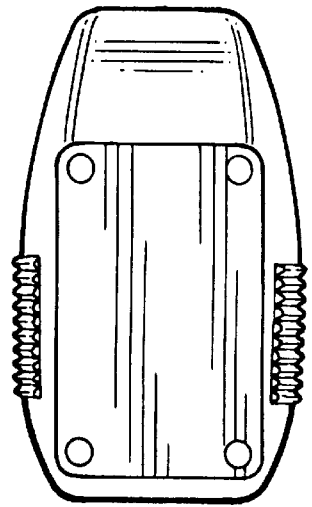
FIG. 13 is a bottom plan view of the vibration unit.

An first alternative embodiment is illustrated in FIG. 4. The decoder unit is designated 16' and the vibration unit is designated 18'. The structure of the two units is essentially the same except that electrical wire 40 has been eliminated. A radio frequency transmitter 60 is mounted in decoder unit 16' and a radio frequency receiver 62 is mounted in the vibration unit 18'. It would also be necessary for the vibration unit to have a D.C. power source in it to provide electrical power for the motor and L.E.D. that would be positioned in the vibration unit.

A second alternative embodiment is illustrated in FIG. 5. The decoder unit is designated 16" and the vibration unit is designated 18". An infrared transmitter 70 is mounted in decoder unit 16" and an infrared receiver 72 is mounted in the vibration unit 18". It would also be necessary for the vibration unit to have a D.C. power source in it to provide electrical power for the motor and L.E.D. that would be positioned in the vibration unit.

FIG. 6 is a schematic illustration of the wearable vibration device 14 showing the I.C. 38 mounted on a circuit board in the vibration unit 18 and being connected by electrical wire 40 to battery 36 mounted in the decoder unit 16.

FIG. 7 is a schematic illustration of block diagram that would apply to both the first and second embodiments. Decoder unit 80 would have a transmitter 84 that could be either a radio frequency transmitter or an infrared transmitter. Vibration unit 82 would have a receiver 86 that could be either a radio frequency receiver or an infrared receiver.

FIGS. 8–13 illustrate the external contour of the different sides of vibration unit 18.

What is claimed is:

1. A retro-fit vibration system for a video game controller that lacks vibration features comprising:

a video game electrical signal decoder unit having an elongated housing having a front wall, a rear wall, a top wall, a left end and a right end; a storage compartment is formed in said housing; an I.C. (integrated circuit) on a circuit board is mounted in said storage compartment; said top wall having a removable battery compartment cover; a D.C. battery source of electrical power removably mounted in said housing; an electrical circuit connected to said I.C. and said D.C. source of electrical power; an on/off mechanical switch extends outwardly from said front wall and it is connected to said electrical circuit for interrupting electrical power from said D.C. battery source of electrical power to said I.C.; a first electrical terminal extending from said right end of said housing for connection to a video game CPU; said first electrical terminal being electrically connected to said I.C. so that electrical signals can be received by said I.C. and decoded; a second electrical terminal extending from said electrical housing for connection to a video game controller that lacks vibration features so that player instructions from a video game controller can be transmitted through said I.C. to said video game CPU;

a vibration unit having a top housing and a bottom housing; an electric motor having a driveshaft is mounted in said bottom housing; a disc is eccentrically mounted on said driveshaft to impart the vibration motion to said vibration unit; said top housing has a lens member and an L.E.D. is mounted in said bottom housing beneath said lens member at a position that allows its light to shine through said lens member; said motor and said L.E.D. being connected to a secondary electrical circuit; said vibration unit having means for removably attaching said vibration unit to a limb of a person in such a manner that said vibration unit is entirely lifted up and moved when said limb is raised and moved; and an electrical wire having a first end removably connected to said secondary electrical circuit in said vibration unit; said electrical wire having a second end removably connected to said I.C. in said video game signal decoder unit.

2. A retro-fit vibration system for a video game controller that lacks vibration features comprising:

a video game electrical signal decoder unit having an elongated housing having a front wall, a rear wall, a top wall, a left end and a right end; a storage compartment is formed in said housing; an I.C. (integrated circuit) on a circuit board is mounted in said storage compartment; said top wall having a removable battery compartment cover; a D.C. battery source of electrical power removably mounted in said housing; an electrical circuit connected to said I.C. and said D.C. source of electrical power; an on/off mechanical switch extends outwardly from said front wall and it is connected to said electrical circuit for interrupting electrical power from said D.C. battery source of electrical power to said I.C.; a first electrical terminal extending from said right end of said housing for connection to a video game CPU; said first electrical terminal being electrically connected to said I.C. so that electrical signals can be received by said I.C. and decoded; a second electrical terminal extending from said electrical housing for connection to a video game controller that lacks vibration features so that player instructions from a video game controller can be transmitted through said I.C. to said video game CPU; a radio frequency transmitter mounted in said decoder unit, said radio frequency transmitter being electrically connected to said I.C. so that said radio frequency transmitter can send instructions to a vibration unit;

a vibration unit having a top housing and a bottom housing; an electric motor having a driveshaft is mounted in said bottom housing; a disc is eccentrically mounted on said driveshaft to impart the vibration motion to said vibration unit; said top housing has a lens member and an L.E.D. is mounted in said bottom housing beneath said lens member at a position that allows its light to shine through said lens member; said motor and said L.E.D. being connected to a secondary electrical circuit that is connected to a battery; said vibration unit having means for removably attaching said vibration unit to a limb of a person in such a manner that said vibration unit is entirely lifted up and moved when said limb is raised and moved; and a radio frequency receiver is mounted in said vibration unit and it is electrically connected to said secondary electrical circuit so that said radio frequency receiver can receive instructions from said radio frequency transmitter in said decoder unit.

3. A retro-fit vibration system for a video game controller that lacks vibration features comprising:

a video game electrical signal decoder unit having an elongated housing having a front wall, a rear wall, a top wall, a left end and a right end; a storage compartment is formed in said housing; an I.C. (integrated circuit) on a circuit board is mounted in said storage compartment; said top wall having a removable battery compartment cover; a D.C. battery source of electrical power removably mounted in said housing; an electrical circuit connected to said I.C. and said D.C. source of electrical power; an on/off mechanical switch extends outwardly from said front wall and it is connected to said electrical circuit for interrupting electrical power from said D.C. battery source of electrical power to said I.C.; a first electrical terminal extending from said right end of said housing for connection to a video game CPU; said first electrical terminal being electrically connected to said I.C. so that electrical signals can be received by said I.C. and decoded; a second electrical terminal extending from said electrical housing for connection to a video game controller that lacks vibration features so that player instructions from a video game controller can be transmitted through said I.C. to said video game CPU; an infrared transmitter mounted in said decoder unit, said infrared transmitter being electrically connected to said I.C. so that said infrared transmitter can send instructions to said vibration unit;

a vibration unit having a top housing and a bottom housing; an electric motor having a driveshaft is mounted in said bottom housing; a disc is eccentrically mounted on said driveshaft to impart the vibration motion to said vibration unit; said top housing has a lens member and an L.E.D. is mounted in said bottom housing beneath said lens member at a position that allows its light to shine through said lens member; said motor and said LED being connected to a secondary electrical circuit; said vibration unit having means for removably attaching said vibration unit to a limb of a person in such a manner that said vibration unit is entirely lifted up and moved when said limb is raised and moved; and an infrared receiver is mounted in said vibration unit and it is electrically connected to said secondary electrical circuit so that said infrared receiver can receive instructions from said infrared transmitter.

\* \* \* \* \*